United States Patent [19]

Staedeli

[11] 4,246,994
[45] Jan. 27, 1981

[54] AUTOMATICALLY ENGAGEABLE SYNCHRONOUS JAW CLUTCH WITH HYDRAULIC ENGAGEMENT-SERVO DEVICE

[75] Inventor: Otto Staedeli, Menzingen, Switzerland

[73] Assignee: Maag Gear-Wheel & Machine Company Ltd., Zürich, Switzerland

[21] Appl. No.: 54,630

[22] Filed: Jul. 2, 1979

[30] Foreign Application Priority Data

Jul. 14, 1978 [CH] Switzerland .................. 7652/78

[51] Int. Cl.³ .................. F16D 11/00; F16D 21/02; F16D 25/061
[52] U.S. Cl. .................. 192/53 H; 192/67 A
[58] Field of Search .................. 192/53 H, 486, 85 A, 192/67 R, 67 A

[56] References Cited

U.S. PATENT DOCUMENTS 2,120,092  6/1938  Doran .................. 192/67 R
3,154,181  10/1964  Sigg .................. 192/67 A

FOREIGN PATENT DOCUMENTS 1181992  7/1965  Fed. Rep. of Germany .

Primary Examiner—Rodney H. Bonck
Attorney, Agent, or Firm—Werner W. Kleeman

[57] ABSTRACT

An automatically engageable synchronous jaw clutch with hydraulic engagement-servo device, comprising a respective toothed drive and power take-off clutch half and a clutch star, which is guided to be axially displaceable by means of a first gear-tooth system upon one of the toothed clutch halves and can be engaged, by means of a second gear-tooth system, with the other clutch half. A screw socket controls, during clutching or engagement, the clutch star. This screw socket is in meshing engagement, by means of a pair of coarse-pitch thread means with one of the clutch halves and can be coupled, by means of a pawl blocking device with the other clutch half. The engagement-servo device contains a piston which entrains the clutch star, and the displacement of the piston, initiated by the screw socket, controls an infeed channel leading to a servo cylinder chamber of the servo device, in order to hydraulically augment the engagement of the clutch. The engagement device is structured as a servo follow-up control wherein the piston as a follow-up piston, when hydraulically loaded or impinged, follows a sliding displacement of the leading screw socket which is axially movable to a limited degree relative to the clutch star and to the piston and opens and closes the infeed channel to the servo cylinder chamber by means of a control groove provided at the piston.

5 Claims, 8 Drawing Figures

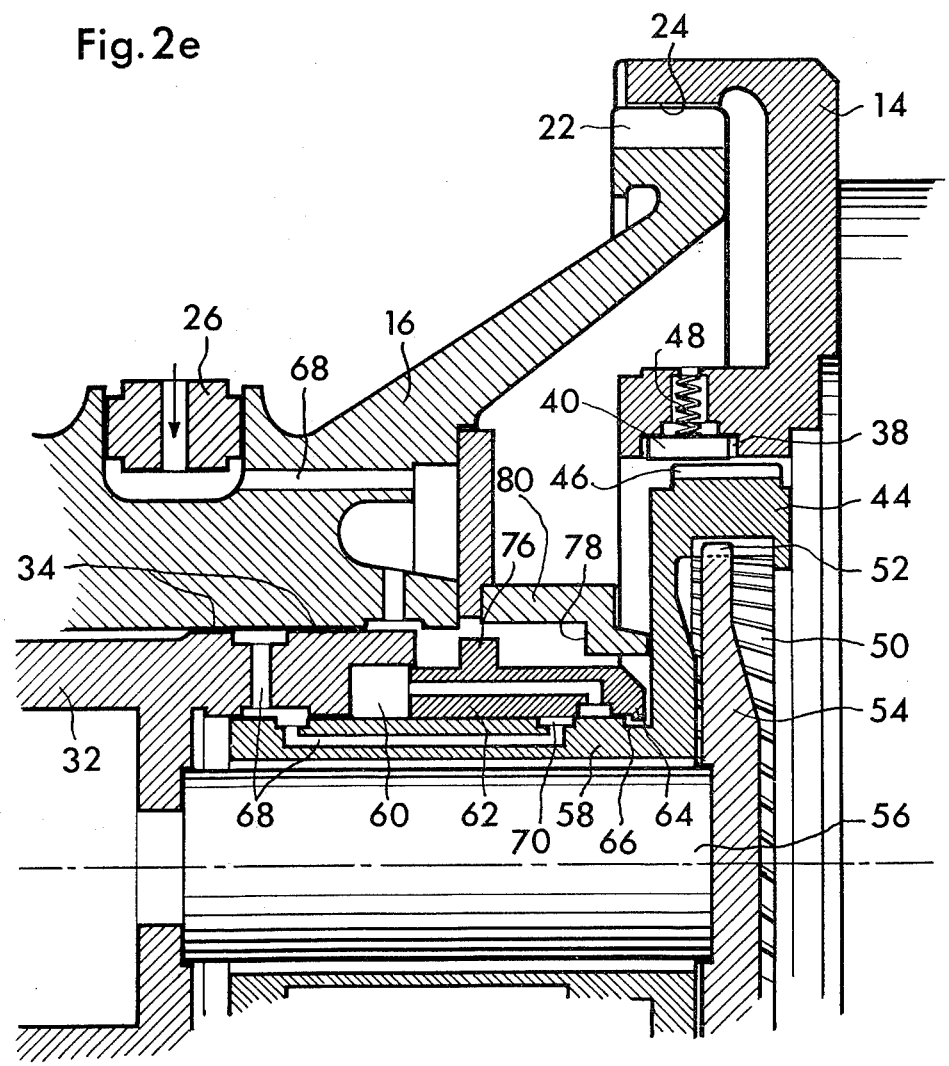

AUTOMATICALLY ENGAGEABLE SYNCHRONOUS JAW CLUTCH WITH HYDRAULIC ENGAGEMENT-SERVO DEVICE

BACKGROUND OF THE INVENTION

The present invention relates to a new and improved construction of automatically engageable synchronous jaw clutch with hydraulic engagement-servo device.

With a state-of-the-art synchronous jaw clutch, as taught in German Pat. No. 1,181,992, and the corresponding U.S. Pat. No. 3,154,181 a respective toothed drive and power take-off clutch half and a clutch star are provided, the clutch star being guided to be axially displaceable by means of a first gear-tooth system upon one of the toothed clutch halves and can be engaged, by means of a second gear-tooth system, with the other clutch half. A screw socket controls, during clutching or engagement, the clutch star. This screw socket is in meshing engagement, by means of a pair of coarse-pitch thread means with one of the clutch halves and can be coupled, by means of a pawl blocking device, with the other clutch half. The engagement-servo device of the jaw clutch contains a piston which entrains the clutch star, and the displacement of the piston, initiated by the screw socket, controls an infeed channel leading to a servo cylinder chamber or compartment of the servo device, in order to hydraulically augment the engagement of the clutch. The screw socket is mounted to be axially non-displaceable in the clutch star and the piston is secured to a piston rod which, together with a head portion formed at its one end, likewise is mounted to be axially non-displaceable in the clutch star. The channel controlled by the piston extends through a fixed bushing in which there is guided the end portion of the piston rod which faces away from the head portion. This end portion has an annular groove at a spacing from the piston, this annular groove being continuously connected by bores with the cylinder compartment or chamber and, when the clutch is disengaged, does not flow communicate with the line controlled by the piston.

With this heretofore known clutch the clutching or engaging operation begins when the drive body, which is connected with a driving unit or machine, overtakes the power take-off body which is connected with a machine which should be driven. The overtaking phenomenon means that the clutch star temporarily leads, in relation to the screw socket, in the drive rotational direction, with the result that the pawl blocking device latches or engages, so that the screw socket is entrained in the drive rotational direction by the clutch star. Consequently, the screw socket carries out a relative rotation in relation to the power take-off body and the pair of coarse-pitch thread means insures that the screw socket carries out a screwing or threading motion towards the power take-off body. Since there is not possible any relative displacement of the screw socket in relation to the clutch star, the screw socket immediately entrains the clutch star in axial direction, whereby its second gear-tooth system begins to engage in the tooth gaps of the gear-tooth system of the power take-off body. In order to facilitate such both gear-tooth systems must be provided with helical portions. When such gear-tooth systems come into engagement with one another at a predetermined length, then the piston, which has been shifted in axial direction by the clutch star, reaches a position in which the channel controlled thereby is connected with the cylinder compartment. From this point on pressurized fluid medium flows without hinderance into the cylinder compartment and the pressure prevailing thereat displaces the piston and together therewith the clutch star further into the clutching or engagement direction, until the second gear-tooth system of the clutch star is completely coupled with the related gear-tooth system of the power take-off body.

The described known clutch has been found to be highly satisfactory even when working with large torques. However, if the clutch should be capable of transmitting extremely large rotational moments or torques, and thus, the clutch star must be dimensioned to be of a corresponding large size, then the moment of inertia of the clutch star can be so large that during a first phase of the engagement or clutching operation an appreciable torque must be transmitted by means of the clutch, in order to shift the clutch star in axial direction to such an extent until, during a second phase of the clutching or engagement operation, the axial force exerted by the pressurized fluid medium upon the piston and from such upon the clutch star, enables the clutch to completely engage. However, the rotational movement or torque required during the first phase, for instance when starting-up turbine-generator units, is not always available. On the other hand, the danger exists that the clutch star, at the end of the clutching operation, attains its end or terminal position, defined by stops, with too greater an axial velocity. Hence, owing to the large moment of inertia of the clutch star and the parts which are moved along their width, it is possible for damage to arise at the clutch itself and equally at the bearings of the shafts which are coupled by such clutch. With the heretofore known clutch it is possible to permit the piston, during the engagement operation, to displace the pressurized fluid medium into a second cylinder chamber or compartment, from where such pressurized fluid medium can outflow by means of a throttle location. However, it is difficult to regulate the throttling action such that it does not additionally render more difficult the incipient stage of the clutching or engagement operation of the clutch.

SUMMARY OF THE INVENTION

Therefore, with the foregoing in mind it is a primary object of the present invention to provide a new and improved construction of jaw clutch which is not afflicted with the aforementioned drawbacks and limitations of the prior art clutch discussed above.

Another and more specific object of the present invention aims at providing a self-synchronizing clutch which even then, if it is designed for transmitting large rotational moments or torques, only requires a minimum torque for the entire clutching operation, even for the first phase thereof.

A further noteworthy object of the present invention is to provide a new and improved construction of automatically engageable synchronous jaw clutch with hydraulic engagement-servo device, which is relatively simple in design and to manufacture, extremely reliable in operation, not readily prone to breakdown or malfunction, and requires a minimum of maintenance and servicing.

Now in order to implement these and still further objects of the invention, which will become more readily apparent as the description proceeds, the synchronous jaw clutch with hydraulic engagement-servo device of the present invention is manifested by the features that, the engagement device is structured as a servo follow-up control wherein the piston as a follow-up piston, when hydraulically loaded or impinged, follows a sliding displacement of the leading screw socket which is axialy movable to a limited degree relative to the clutch star and to the piston and opens and closes the infeed channel to the servo cylinder chamber or compartment by means of a control groove provided at the piston.

By means of the invention there is achieved the beneficial result that, the torque transmitted by means of the pawl blocking device need only be so large that there is formed an axial force at the pair of coarse-pitch thread means, which is just large enough to alone axially displace the screw socket, whereas the clutch star and together therewith the piston initially remains stationary. The screw socket therefore leads the piston, and consequently, prior to the time that the clutch star has begun its axial movement, the pressurized fluid medium frees the path in the cylinder compartment, so that right from the start the force, exerted by the pressurized fluid medium upon the piston and via such upon the clutch star, axially shifts the clutch star in the clutching or engagement direction. This axial shifting or displacement however is accomplished in a controlled manner, since the inflow of the pressurized fluid medium to the cylinder compartment is automatically throttled or, in fact, completely interrupted when the piston leaves the screw socket.

According to a further feature of the invention a partial section or portion of the infeed channel extends through an axial extension or projection of the screw socket upon which there is guided the follow-up piston constructed as an annular or ring piston.

A further feature of the invention contemplates that the follow-up piston is displaceable, in the declutching or disengagement direction, relative to the clutch star.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 2a to 2e respectively show axial sectional views of the synchronization device of the synchronous jaw clutch of the arrangement of FIG. 1, and specifically;

FIG. 2a illustrates the clutch arrangement in its disengaged or declutched state;

FIG. 2b illustrates the clutch arrangement in a position ready for engagement or clutching;

FIG. 2c illustrates the clutch arrangement during synchronization;

FIG. 2d illustrates the clutch arrangement at the end of synchronization;

FIG. 2e illustrates the clutch arrangement in the engaged state;

FIG. 3a illustrates an enlarged detail sectional showing of the arrangement of FIG. 2a.

DETAILED DESCRIPTION OF THE PREFERRED EMBODIMENTS

Figure 1:
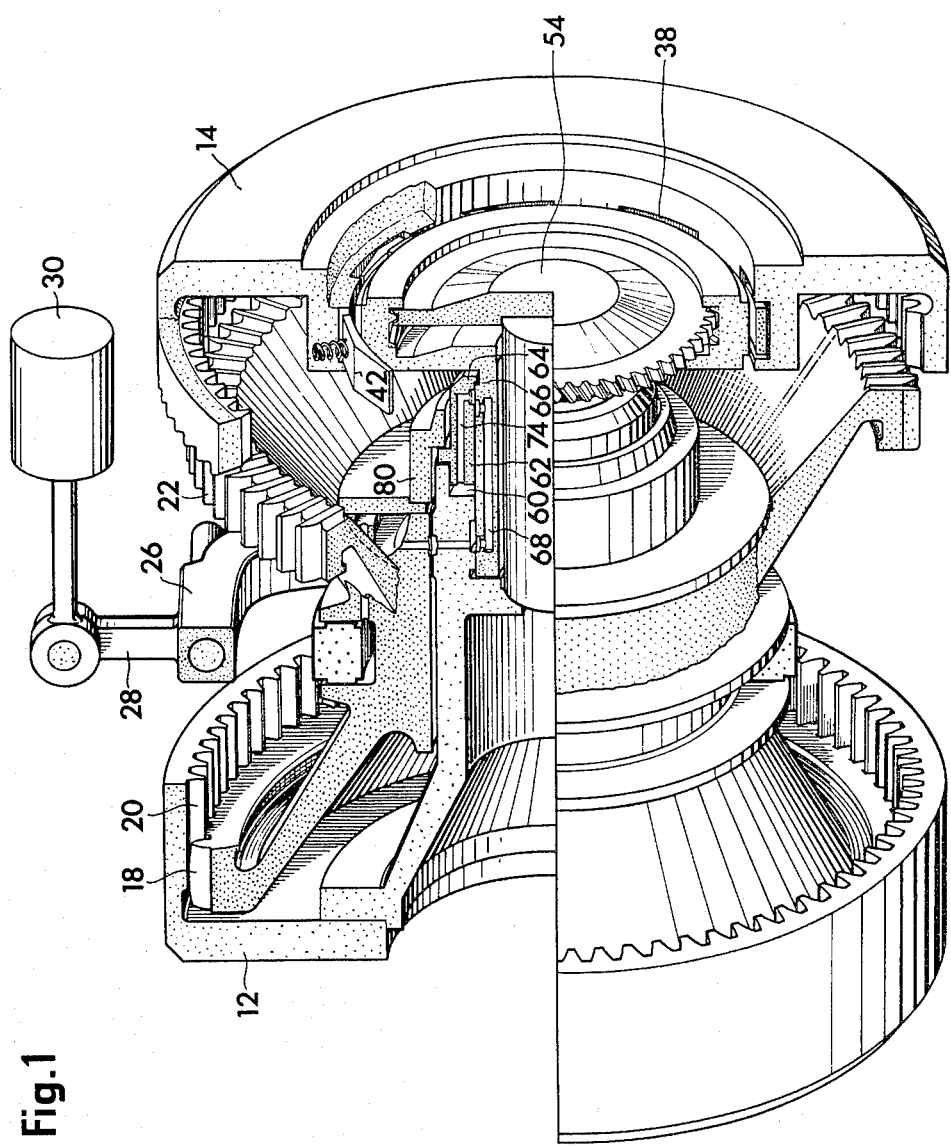
FIG. 1 is a perspective cutaway view of a synchronous jaw clutch depicted in its disengaged or declutched state.

Describing now the drawings, the exemplary illustrated synchronous jaw clutch will be seen to comprise a drive clutch or coupling half 12 which is fixedly connected with a drive machine or unit, for instance typically a gas turbine by way of example and not limitation, and a power take-off clutch or coupling half 14. The latter is arranged at a determined axial spacing from the drive clutch half 12, and this power take-off clutch half 14 is fixedly connected with a driven machine or unit, for instance typically a generator, again by way of example and not limitation. Further, the synchronous jaw clutch comprises a clutch star 16 arranged to be axially displaceable between the drive clutch half 12 and the power take-off clutch half 14. This clutch star 16 or equivalent structure has a straight gear-tooth system or straight gear teeth 18 which continuously mesh with a complementary internal gear-tooth system 20 of the drive clutch half 12. Additionally, the clutch star 16 is further provided with a second straight, helical external gear-tooth system or teeth 22. The external gear-tooth system or gear teeth 22, by axially displacing the clutch star 16, can be brought into engagement with a straight, helical internal gear-tooth system or teeth 24 of the power take-off clutch half 14. The clutch star 16 is connected, by means of a displacement or shift ring 26 and a rod 28 or equivalent structure, with a hydraulic control device or control means 30.

Figure 2A:
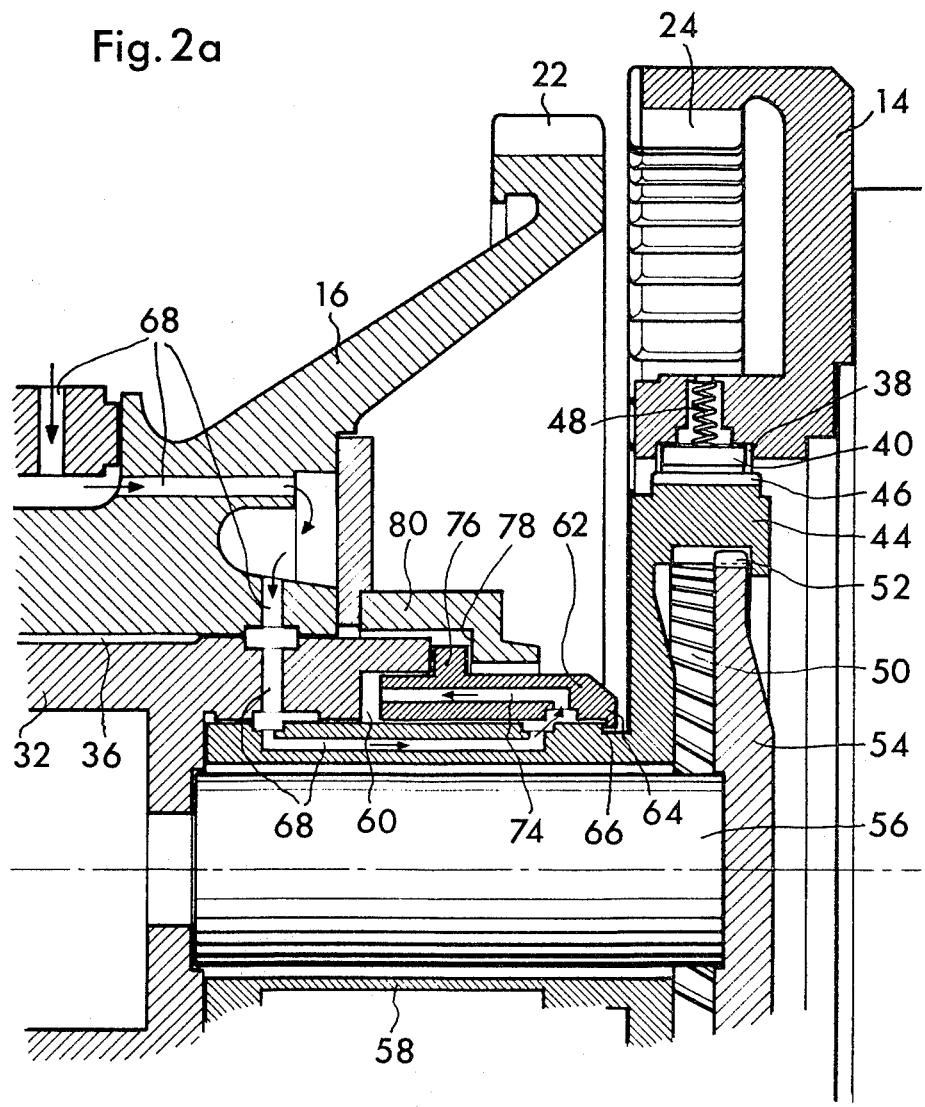
Figure 3A:
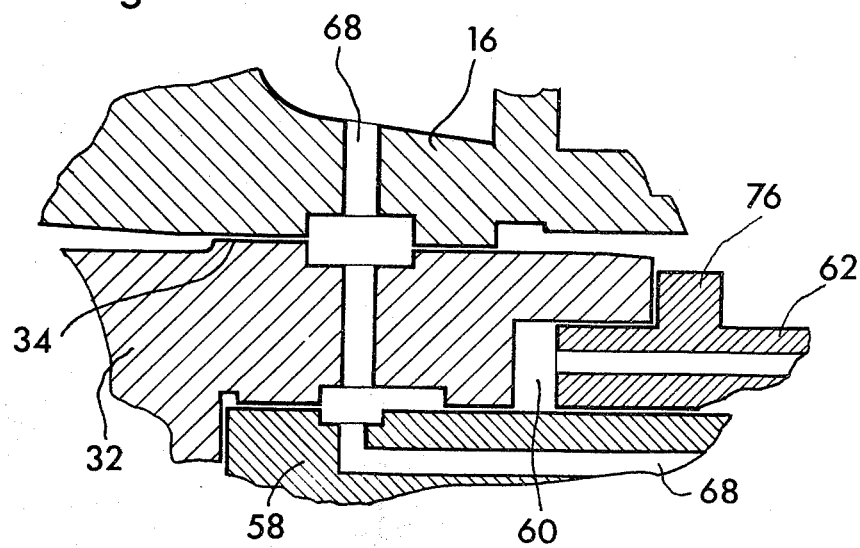
Figure 3B:
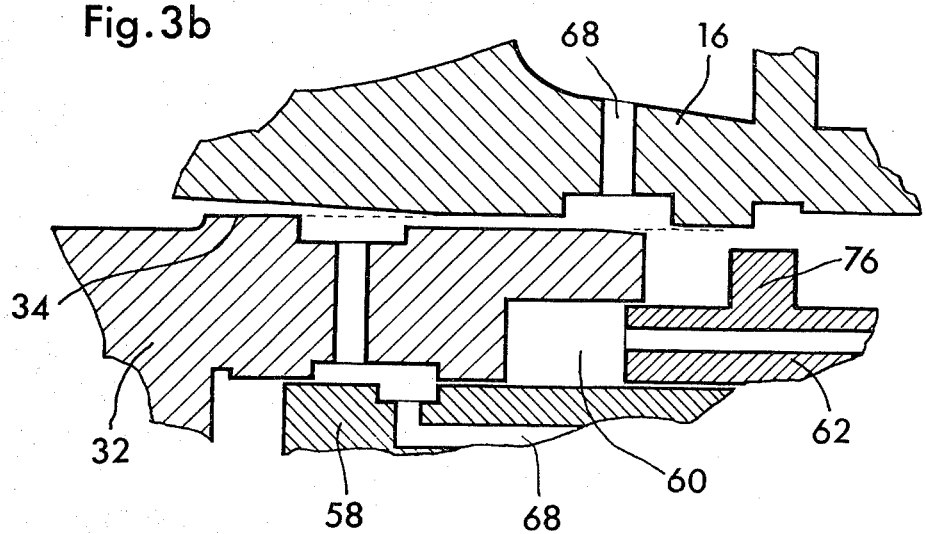
FIG. 3b illustrates a corresponding detailed sectional showing of the arrangement of FIG. 2e.

With the clutch disengaged, as best seen by referring to FIGS. 1, 2a and 3a, the clutch star 16 is supported and centered, on the one hand, by the gear-teeth systems or gear teeth 18 and 20 and, on the other hand, by a support tube 32 which is secured coaxially upon the drive clutch half 12. The support tube 32 possesses, for this purpose, a centering collar 34 which coacts with a portion 36 of reduced diameter of an axial bore of the clutch star 16 so long as the jaw clutch is not engaged. When the clutch is engaged the clutch star 16 is supported and centered, on the one hand, by the gear teeth systems or gear teeth 18 and 20 and, on the other hand, by the gear teeth 22 and 24, whereas there is then eliminated the supporting action at the centering collar 34, as best seen by referring to FIGS. 2e and 3b.

Internally of the power take-off clutch half 14 there are formed recesses or depressions 38 or equivalent structure, in which there is arranged a respective pawl 40 which bears by means of a pivot or tilt edge 42, formed at its outer surface, at the wall of such related recess 38. Operatively associated with the pawls 40 is an axially displaceable or shiftable screw socket 44 having a pawl gear-tooth system or ratchet 46 formed at the outer circumference thereof. The not particularly referenced teeth of the pawl gear-tooth system or ratchet 46 have a smaller or larger angular rotational spacing than the recesses 38 and, accordingly, the pawls. The product of the number of pawls 40 and the number of teeth of the ratchet 46 is equal to the number of teeth of the gear teeth or gear-tooth systems 20 and 22. Consequently, the gear teeth 20 and 22 always then can be engaged when one of the pawls 40 engages behind a tooth of the ratchet 46.

Each pawl has operatively associated therewith a pressure or compression spring 48 or equivalent structure, which is supported at the power take-off clutch half 14 in approximately radial direction. Each such compression spring 48 strives to press the related pawl 40 so as to engage or mesh with the ratchet or pawl gear-tooth system 46. The mass of each pawl 40, in relation to the tilt edge 42, is distributed in such a manner that, the pawls, under the action of the centrifugal forces which arise in the presence of high rotational speeds of the power take-off clutch half 14, strive to overcome the forces of the compression springs 48, to lift-off from the ratchet 46 and thus to avoid any further contact with the screw socket 44 or equivalent structure.

Formed internally of the screw socket 44 is a coarse-pitch threading or thread means 50 engaging with complementary external coarse-pitch threading or thread means 52 of a disk or plate 54 or equivalent structure. The disk 54 is fixedly connected, by means of a support shaft 56 with the support tube 32, and by means of the latter with the drive clutch half 12. The screw socket 44, which thus is centered by means of the coarse-pitch threading or thread means 50 and 52 in relation to the support tube 32, on the other hand possesses a tubular-shaped axial projection or extension 58. This axial projection or extension 58 is guided to be axially displaceable at the support tube 32 and limits therewith a substantially ring-shaped or annular servo cylinder compartment or chamber 60. A substantially ring-shaped or annular follow-up piston 62 is guided to be axially displaceable upon the axial projection or extension 58. This follow-up piston 62 protrudes, by means of its one end, into the servo cylinder compartment 60. At its other end such follow-up piston 62 carries a collar 64 engaging into an annular or ring-shaped groove 66 of the tube-shaped projection 58. The ring-shaped groove 66 is wider than the collar 64, so that it enables and limits axial movements of the follow-up piston 62.

The clutch star 16, the support tube 32 and the axial projection 58 of the screw collar 44 possess infeed channels or ducts 68, through which there is infed oil for any possible axial position of the screw socket 44. The infed oil is delivered by a lubrication system through the displacement ring 26 of the clutch star 16 to an external, substantially ring-shaped control groove 70 of the projection 58. The external control groove 70 has operatively associated therewith an internal control groove 72 which is machined at the follow-up piston 62. The internal control groove 72 is flow connected by channels or ducts 74 in the follow-up piston 62 with the servo cylinder compartment or chamber 60.

Continuing, it will be observed the follow-up piston 62 has an outer collar 76 with which there is operatively associated an inner shoulder 78 of an entrainment sleeve or bushing 80 secured at the clutch star 16, so that the follow-up piston 62 can axially entrain, in the clutching direction, the clutch star 16.

In the description to follow there will now be described the mode of operation of the clutch, there being assumed that the driving machine, and thus also the drive clutch half 12, initially is at standstill and the clutch is disengaged, with the gear teeth 22 and 24 therefore being out of engagement with one another. This condition has been shown in FIGS. 1, 2a and 3a. The hydraulic control device 30 exerts such a force upon the displacement ring 26—this force being directed towards the left of the showing of the drawings—that the clutch star 16 is retained in the disengaged or declutched position. Hence, the shoulder 78 of the entrainment sleeve 80 attached at the clutch star, presses the collar 76 of the follow-up piston 62 against the neighboring end surface of face of the support tube 32. The follow-up piston 62 thus retains, by means of its collar 64, the screw socket 44 fixed in axial direction. The pressurized fluid medium, here assumed to be oil under pressure, arriving by means of the displacement ring 26, the channels 68, the control grooves 70 and 72 and the infeed channels 74 in the servo cylinder compartment or chamber 60, exerts a force upon the follow-up piston 62 which, while opposing the retention force of the control device 30, is nonetheless considerably smaller so that the clutch remains in the disengaged state shown in FIGS. 1, 2a and 3a. Now it is assumed that the machine which is fixedly connected with the power take-off clutch half 14, and thus also the power take-off clutch half itself, already rotate at the normal operating rotational speed. The co-rotating pawls 40 are raised from the ratchet or pawl gear-tooth system 46, since the centrifugal force acting upon the pawls 40 is significantly greater than the force of the compression springs 48. Hence, there does not prevail any frictional contact between the stationary and the revolving components of the clutch.

Now if the drive machine should be coupled with the driven machine, then, on the one hand, the rotational speed of the driven machine is reduced, and, on the other hand, the drive machine is rotated at a relatively small rotational speed amounting to, for instance, 100 revolutions per minute. If the drive machine is assumed, for instance, to constitute a gas turbine, then such rotation typically occurs through the use of an auxiliary drive. The control device 30 is activated, for instance by a standard electromagnetic valve, although other switching devices can be employed, such that the holding force exerted by means of the displacement ring 26 upon the clutch star 16 in the declutching direction, is reduced, and consequently, becomes smaller than the hydraulic force which is effective at the follow-up piston 62 in the clutching direction. The oil pressure prevailing in the servo cylinder compartment or chamber 60 now displaces the follow-up piston 62 in the direction of the power take-off clutch half 14. The follow-up piston 62, together with its collar 76, is pressed against the shoulder 78 of the entrainment sleeve 80 and by means of such entrains the entire clutch star 16. This movement is transmitted, by the displacement ring 26 and the rod 28, to the control device 30.

Figure 2B:
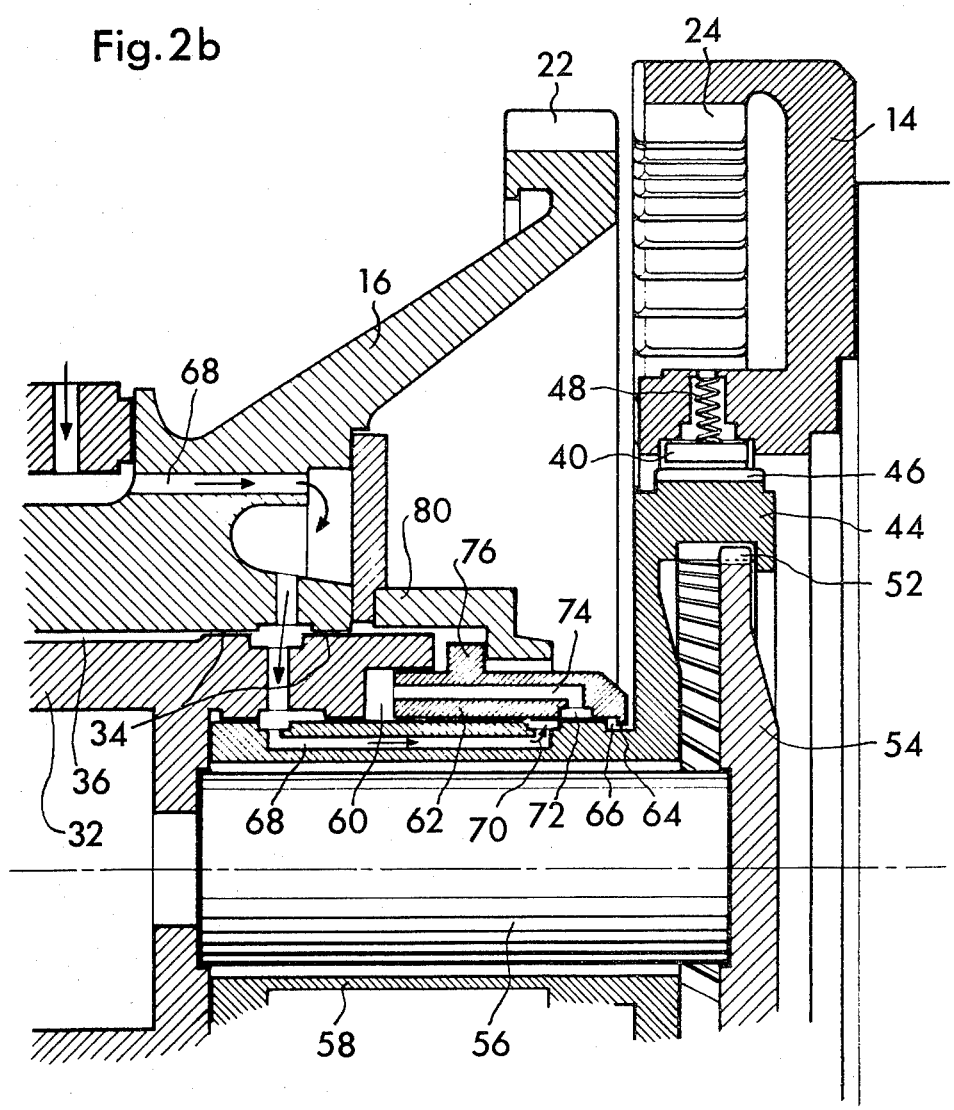

Initially, the screw socket 44 does not participate in the aforedescribed displacement of the follow-up piston 62, because the collar 64 of the follow-up piston 62 has axial play in the ring or annular groove 66 of the tubular-shaped projection or extension 58. Therefore, the follow-up piston 62 initially is only displaced to such an extent in the clutching or engaging direction, until the control groove 70 no longer overlaps with the control groove 72, so that the oil infeed to the servo cylinder compartment 60 is interrupted. An equilibrium condition is established between the force of the control device 30, effective in the disengaging or declutching direction and the force of the follow-up piston 62, effective in the clutching or engagement direction. Hence, as shown in FIG. 2b, the clutch is now in its preparatory position.

Figure 2C:
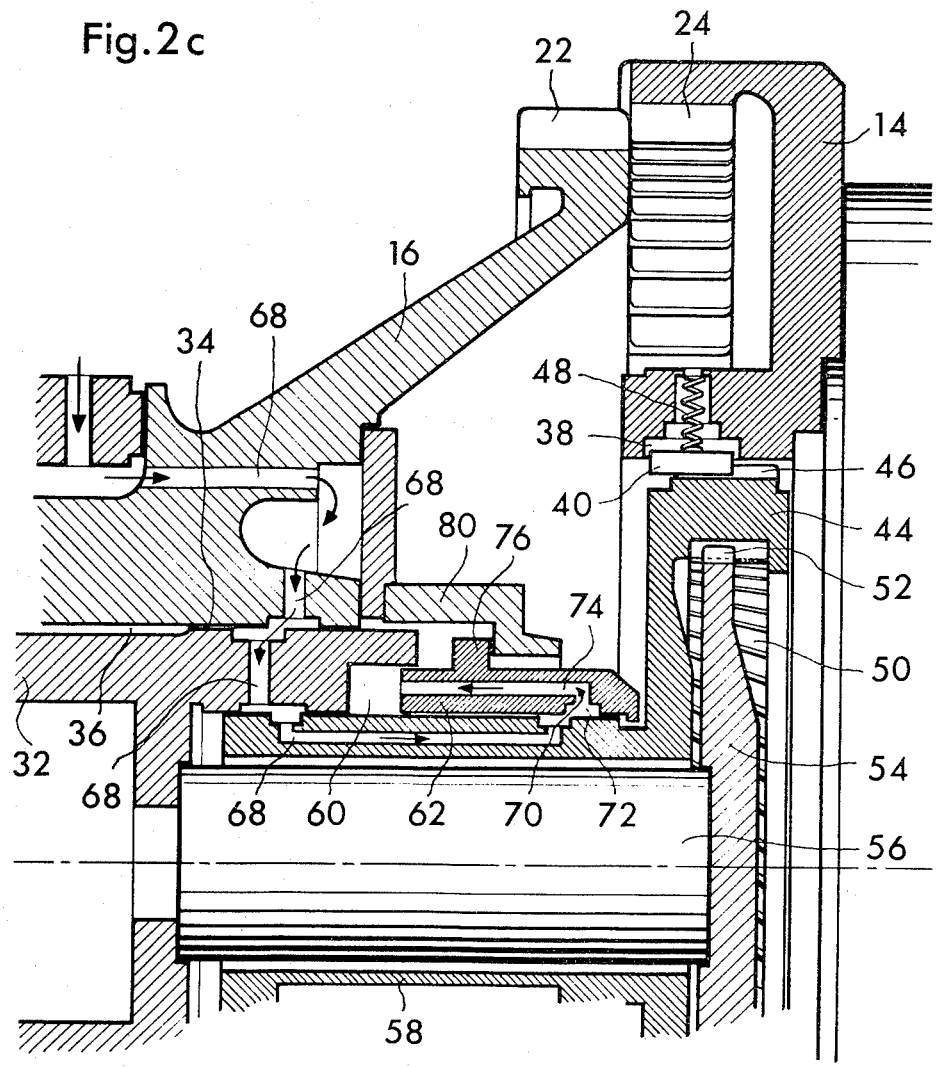
Figure 2D:
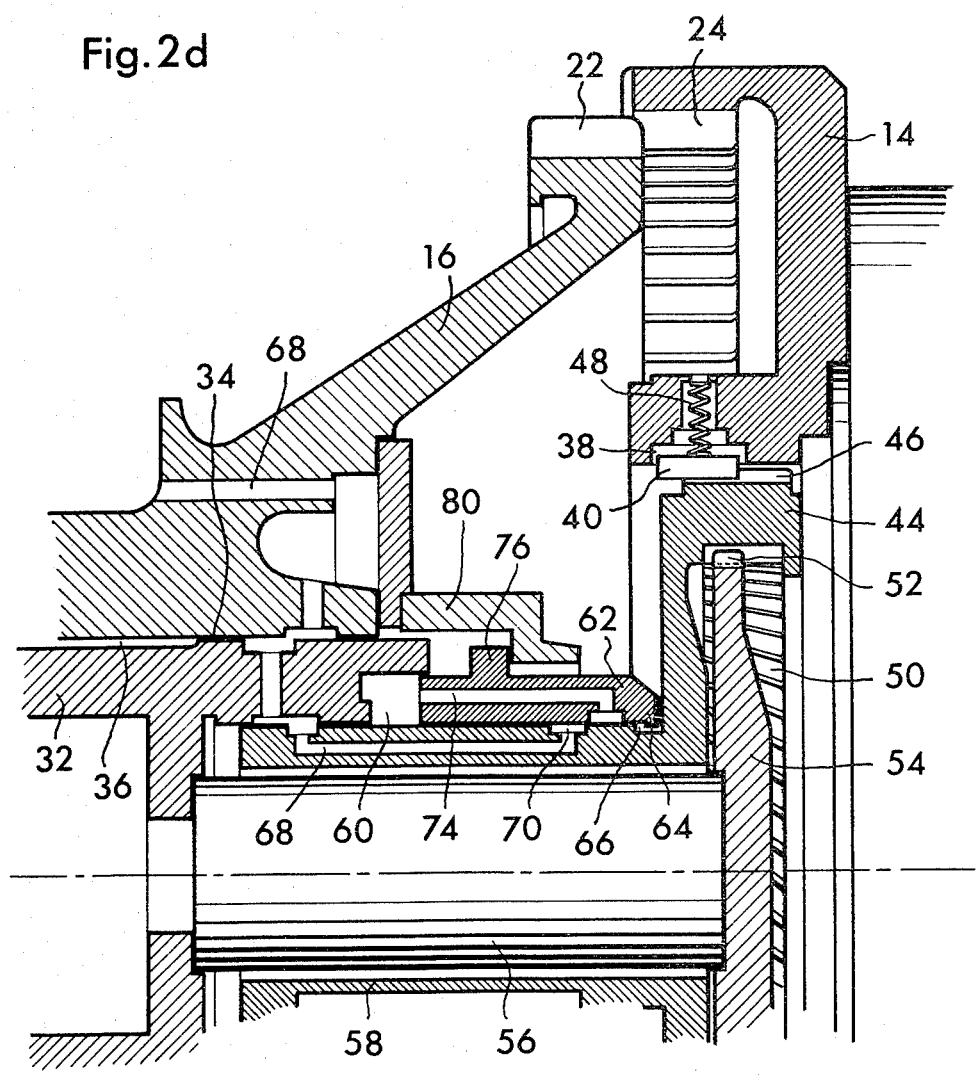

If the machine, which should be driven by means of the synchronous jaw clutch, further slows down, then there is ultimately attained a rotational speed at which the force of the compression springs 48 overcomes the centrifugal force effective at the pawls 40 and pushes such pawls 40 against the ratchet 46, until finally one of the pawls 40 latches behind a tooth of the ratchet or pawl gear-tooth system 46. If the rotational speed of the machine which is to be driven drops further, then it finally falls below that of the drive machine. Consequently, the disk 54, attached at the support shaft 56, overtakes the screw socket 44, which, in turn, is hindered by the latched pawl 40 in overtaking the power take-off coupling half 14. Therefore, there prevails at the course-pitch threading or thread means 50 and 51 an axial force, effective in the clutching or engagement direction, which displaces the screw socket 44 in the direction of the power take-off clutch half 14, and specifically, relative thereto purely axially, but relative to the disk 54, and thus also to the drive clutch half 12 and to the clutch star 16, in a helical or screw motion corresponding to the pitch of the coarse-pitch threading 50 and 52. Owing to the axial movement of the screw socket 44 together with the projection or extension 58, while initially the follow-up piston 62 is still at standstill, the control grooves 70 and 72 again overlap one another, i.e., are in flow communication with one another, so that further oil can flow into the servo cylinder compartment 60, as this has been shown specifically in FIG. 2c. As a result, the follow-up piston 62 again is shifted in the clutching or engagement direction, until the oil inflow to the servo cylinder compartment 60 has again been interrupted, as the same has been illustrated in FIG. 2d.

In the preceding discussion, as a matter of simplicity, there has been considered to be negligible the throttle action prevailing between the edges of the control grooves 70 and 72. In reality, this throttle action has the result that the follow-up piston 62 does not move stepwise, rather continuously, and thus, the clutch star 16 continuously readjusts the screw socket 44. In this phase of the engagement operation the screw socket 44 need only fulfill a control function. The force for displacing the clutch star 16 is applied by the oil in the servo cylinder compartment 60, and thus there are generated large axial displacement forces, without the pawls 40 and pawl gear-tooth system or ratchet 46 being loaded with any appreciable torque or rotational moment.

The described displacement of the clutch star results in its outer or external gear-tooth system 22 threading into the internal gear-tooth system 24 of the power take-off clutch half 14, with a helical or screw motion, the pitch of which corresponds to that of the coarse-pitch threading 50 and 52.

As soon as there has been attained a certain axial overlapping of the teeth systems 22 and 24, then the previously mentioned, but not illustrated conventional electromagnetic valve is switched, with the result that there is reversed the direction of the mechanical force exerted by the hydraulic control device 30 through the intermediary of the rod 28 of the displacement ring 26 upon the clutch star 16. Consequently, this clutch star 16 is further accelerated in the engagement or clutching direction, until the gear-tooth systems 22 and 24 are completely engaged, as shown in FIG. 2e. The scew socket 44, during this last phase of the engagement or clutching motion, does not have any function and also does not participate in the further axial movement of the clutch star 16. Therefore, the shoulder 78 of the entrainment sleeve 80 is distanced from the collar 76 of the follow-up piston 62.

Now the drive machine is run-up to speed, and thus, the clutch can be loaded with its full operating torque, since the screw socket 44 only loosely co-rotates and the pawls 40 are no longer loaded. Hence, the pawls 40 can disengage or lift-off from the ratchet 46, as soon as there has been reached the rotational speed at which the centrifugal forces acting upon the pawls 40 are greater than the forces of the compression springs 48.

The disengagement of the synchronous jaw clutch can be triggered at any random rotational speed in conventional manner in that, the aforementioned electromagnetic valve has infed thereto a switching signal, and thus, pressurized oil is conducted to the disengaging side of the control device 30 and at the same time there is load relieved the engaging or clutching side thereof. As a consequence, the control device 30 displaces the clutch star 16 towards the drive clutch half 12, by means of the rod 28 and the displacement ring 26, so that the gear-tooth systems 22 and 24 come out of meshing engagement. The follow-up piston 62 is displaced back into its starting position, shown in FIGS. 1 and 2a, by the entrainment sleeve 80, the shoulder 78 of which presses against the collar 76, and in this starting position the follow-up piston 62 entrains by means of its collar 64 also the screw socket 44.

While there are shown and described present preferred embodiments of the invention, it is to be distinctly understood that the invention is not limited thereto, but may be otherwise variously embodied and practiced within the scope of the following claims. Accordingly,

What I claim is:

1. An automatically engageable synchronous jaw clutch with hydraulic engagement-servo device, comprising:
   a toothed drive clutch half;
   a toothed power take-off clutch half;
   a clutch star;
   a first gear-tooth system for guiding said clutch star so as to be axially displaceable upon one of the toothed clutch halves;
   a second gear-tooth system for engaging the clutch star with the other clutch half;
   a screw socket for controlling, during engagement of the clutch, said clutch star;
   a pair of coarse-pitch thread means for meshingly engaging said screw socket with one of the clutch halves;
   a pawl blocking device for coupling said screw socket with the other clutch half;
   an engagement-servo device provided for said clutch and containing a piston which entrains said clutch star;
   said servo device having a servo cylinder compartment;
   an infeed channel leading to said servo cylinder compartment;
   said piston being displaceable by the action of said screw socket in order to control said infeed channel leading to said servo cylinder compartment, in order to hydraulically augment the engagement of the clutch;
   said engagement-servo device being structured as a servo follow-up control wherein said piston constitutes a follow-up piston;
   said follow-up piston being provided with a control groove; and
   said follow-up piston, when hydraulically loaded, following a sliding displacement of the leading screw socket which is axially movable to a limited degree relative to the clutch star and to the follow-up piston and opens and closes, by means of said control groove provided at said follow-up piston, the infeed channel to the servo cylinder compartment.

2. The jaw clutch as defined in claim 1, wherein:
said screw socket has an axial projection upon which there is guided said follow-up piston;
said follow-up piston being structured as a ring piston; and
a portion of said infeed channel extending through said axial projection.

3. The jaw clutch as defined in claim 2, wherein:
said follow-up piston is mounted for relative movement with respect to the clutch star in a direction corresponding to disengagement of the clutch.

4. The jaw cluch as defined in claim 1, wherein:
said follow-up piston is mounted for relative movement with respect to the clutch star in a direction corresponding to disengagement of the clutch.

5. An automatically engageable synchronous jaw clutch with hydraulic engagement-servo means, comprising:
a toothed drive clutch half;
a toothed power take-off clutch half;
a clutch star;
a first gear-tooth system for guiding said clutch star so as to be axially displaceable upon one of the toothed clutch halves;
a second gear-tooth system for engaging the clutch star with the other clutch half;
displaceable socket means for controlling said clutch star;
a pair of thread means for engaging said socket means with said one clutch half;
a blocking device for coupling said socket means with said other clutch half;
an engagement-servo means provided for said clutch and containing a piston which entrains said clutch star;
said servo means having servo cylinder compartment means;
infeed channel means leading to said servo cylinder compartment means;
said piston means displaceable by the action of said socket means in order to control said infeed channel means leading to said servo cylinder compartment means, in order to hydraulically augment the engagement of the clutch;
said engagement-servo means comprising servo follow-up control means wherein said piston constitutes a follow-up piston;
said follow-up piston being provided with control groove means; and
said follow-up piston, when hydraulically loaded, following displacement of the socket means which is axially movable to a limited degree relative to the clutch star and to the follow-up piston and opens and closes, by means of said control groove means provided at said follow-up piston, the infeed channel means to the servo cylinder compartment means.

* * * * *